(12) United States Patent
Chen et al.

(10) Patent No.: US 9,809,431 B2
(45) Date of Patent: Nov. 7, 2017

(54) OIL RETURN MECHANISM

(71) Applicant: CHANGSHU TONGRUN AUTO ACCESSORY CO., LTD., Suzhou (CN)

(72) Inventors: Jiang Chen, Suzhou (CN); Junxue Ye, Suzhou (CN); Jingfang Wang, Suzhou (CN)

(73) Assignee: CHANGSHU TONGRUN AUTO ACCESSORY CO., LTD., Suzhou (CN)

( * ) Notice: Subject to any disclaimer, the term of this patent is extended or adjusted under 35 U.S.C. 154(b) by 216 days.

(21) Appl. No.: 14/653,856

(22) PCT Filed: Apr. 17, 2015

(86) PCT No.: PCT/CN2015/076874
§ 371 (c)(1),
(2) Date: Jun. 19, 2015

(87) PCT Pub. No.: WO2016/149968
PCT Pub. Date: Sep. 29, 2016

(65) Prior Publication Data
US 2017/0036897 A1  Feb. 9, 2017

(30) Foreign Application Priority Data

Mar. 23, 2015 (CN) ............ 2015 1 0127851

(51) Int. Cl.
*B66F 3/25* (2006.01)
*F04B 53/16* (2006.01)
(Continued)

(52) U.S. Cl.
CPC ............... *B66F 3/25* (2013.01); *F04B 53/16* (2013.01); *F15B 1/26* (2013.01); *F15B 15/20* (2013.01);
(Continued)

(58) Field of Classification Search
CPC .... B66F 3/25; B66F 3/42; F04B 53/16; F15B 15/20; F16K 17/20; G05D 7/0133;
(Continued)

(56) References Cited

U.S. PATENT DOCUMENTS 3,228,658 A * 1/1966 London ............... B66F 3/25
137/498
2005/0226744 A1* 10/2005 Yueh ............... B66F 5/04
417/415
(Continued)

FOREIGN PATENT DOCUMENTS

ES  WO 2014188039 A1 * 11/2014 ............ B66F 3/42
TW  EP 1468956 A1 * 10/2004 ............ B66F 3/42

*Primary Examiner* — Jessica Cahill
(74) *Attorney, Agent, or Firm* — Gokalp Bayramoglu

(57) ABSTRACT

An oil return mechanism includes a base, a control switch, a first blocking ball mounted in the base, an elastic member mounted between the first blocking ball and the base. The base has a liquid storing cavity, a liquid returning cavity, a communicating cavity, a first communicating opening communicating between the liquid returning cavity and the communicating cavity, and a second communicating opening communicating between the communicating cavity and the liquid storing cavity. The present invention can regulate a speed of a fluid flowing from the liquid returning cavity to the communicating cavity, and has the advantages of simple structure and great reduction of cost.

8 Claims, 4 Drawing Sheets

(51) Int. Cl.
  *F15B 15/20* (2006.01)
  *F16K 17/20* (2006.01)
  *G05D 7/01* (2006.01)
  *F15B 1/26* (2006.01)
  *F15B 15/14* (2006.01)

(52) U.S. Cl.
  CPC .......... *F15B 15/202* (2013.01); *F15B 15/204* (2013.01); *F16K 17/20* (2013.01); *G05D 7/0133* (2013.01); *G05D 7/0186* (2013.01); *F15B 15/1428* (2013.01); *F15B 15/1433* (2013.01); *Y10T 137/7847* (2015.04)

(58) Field of Classification Search
  CPC ....... Y10T 137/7846; Y10T 137/87917; Y10T 137/88046; Y10T 137/88054
  See application file for complete search history.

(56) References Cited

U.S. PATENT DOCUMENTS

| | | | | |
|---|---|---|---|---|
| 2008/0048159 A1* | 2/2008 | Dai | ........................... | B66F 3/25 254/93 H |
| 2010/0252791 A1* | 10/2010 | Lancione | .................. | B66F 3/25 254/93 R |
| 2015/0122340 A1* | 5/2015 | Edelmayer | ................ | F01L 9/02 137/12 |

* cited by examiner

OIL RETURN MECHANISM

BACKGROUND

A jack is generally configured with an oil return mechanism. A conventional oil return mechanism includes a liquid storing cavity, a liquid returning cavity, and a communicating cavity communicating between the liquid storing cavity and the liquid returning cavity. The communicating cavity is configured with a control switch for selectively conducting the on-off control of the communicating cavity. A speed of a fluid flowing from the liquid returning cavity to the communicating cavity has a direct impact on a descending speed of the jack in operation. However, when the control switch is on, the speed of the fluid flowing from the liquid returning cavity to the communicating cavity remains stable, and thus the jack descends rapidly either in a no load condition or in a load condition, which may result in accidents, for instance, a lifting load rapidly falling down from the operating jack to hurt an operator. Therefore, the conventional oil return mechanism is configured with a speed regulating device for regulating the speed of the fluid flowing from the liquid returning cavity to the communicating cavity in accordance with the different operation condition of the jack. However, the expensive speed regulating device adds significant cost to the oil return mechanism, and thus the oil return mechanism fails to satisfy industrial require's.

SUMMARY OF THE INVENTION

To overcome the defects described above, the present invention provides an oil return mechanism which can regulate a speed of a fluid flowing from a liquid returning cavity to the communicating cavity, and reduce costs efficiently.

Some embodiments of the present invention refer to:

An oil return mechanism, comprising:

a base, a control switch, a first blocking ball mounted in the base, an elastic member mounted between the first blocking ball and the base; wherein the base has a liquid storing cavity, a liquid retaining cavity, a communicating cavity, a first communicating opening communicating between the liquid returning cavity and the communicating cavity, and a second communicating opening communicating between the communicating cavity and the liquid storing cavity; the control switch is adapted for controlling the second communicating opening open or closed so that the communicating cavity and the liquid storing cavity are connected or separated; the first blocking ball moves between a blocking position and an open position with an external force; when the first blocking ball is in the open position, the whole first communicating opening is open, and thus a fluid flows from the liquid returning cavity to the communicating cavity; the first communicating opening is positioned in a communicating portion of the base; when the first blocking ball is in the blocking position, one or more liquid guiding gaps are firmed between the first blocking ball and the communicating portion of the base; and the liquid guiding gap communicates between the liquid returning cavity and the communicating cavity.

The control switch includes a second blocking ball mounted in the base and a valve rod; the valve rod is adapted for pushing the second blocking ball in a sealing position for sealing the second communicating opening; and the valve rod is threadly coupled to the base.

An end of the elastic member is mounted in the communicating cavity, and the other end of the elastic member is positioned against the first blocking ball.

The first blocking ball moves between the blocking position and the open position under the cooperative control of an elastic force of the elastic member and a hydraulic pressure of the liquid in the liquid returning cavity.

The open position is positioned in an end of the liquid returning cavity adjacent to the first communicating opening, and a diameter of the end of the liquid returning cavity is larger than the one of the first blocking ball.

The elastic force generated by the elastic member acts on the first blocking ball from the blocking position to the open position.

The elastic member is a spring.

A plurality of liquid guiding gaps is formed between the first blocking ball and the communicating portion of the base.

Beneficial effects of the present invention are as follows:

In use, when the first blocking ball moves to the open position of the blocking position, the fluid can flow to the communicating cavity through the second communicating cavity or the liquid guiding gap, to reduce the amount of the flowing liquid, and thus regulate the speed of the fluid flowing from the liquid returning cavity to the communicating cavity. Moreover, the present invention has the advantages of simple structure, convenient manufacture and great reduction of cost. The liquid guiding gap formed between the first blocking ball and an inner wall of the communicating portion has an advantage of avoiding clogging.

Figure 1:
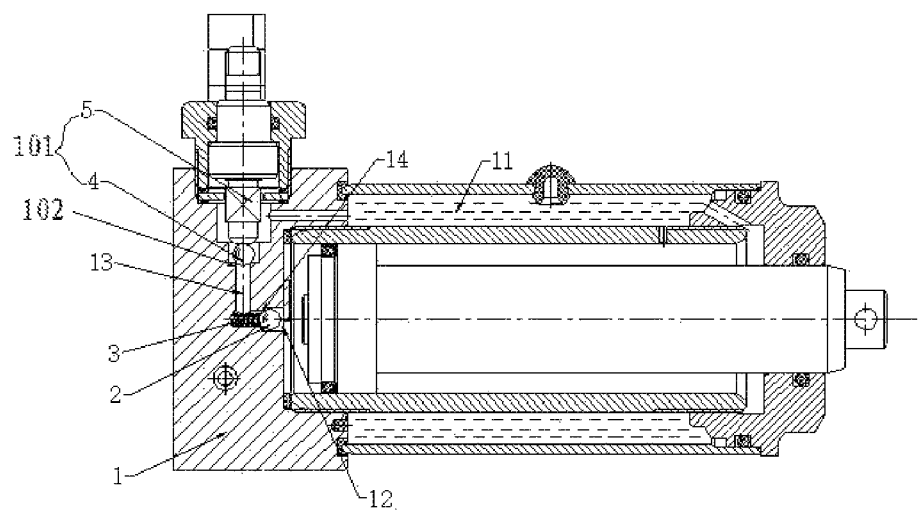
FIG. 1 is a construction schematic diagram of the present invention.

Reference numbers in the drawings are as follow:

1, base; 11, liquid storing cavity; 12, liquid returning cavity; 13, communicating cavity; 14, first communicating opening; 15 liquid guiding gap; 2, first blocking ball; 3, elastic member; 4, second blocking ball; 5, valve rod; 101, control switch; 102, second communicating opening.

DETAILED DESCRIPTION OF THE PREFERRED EMBODIMENTS

Figure 2:
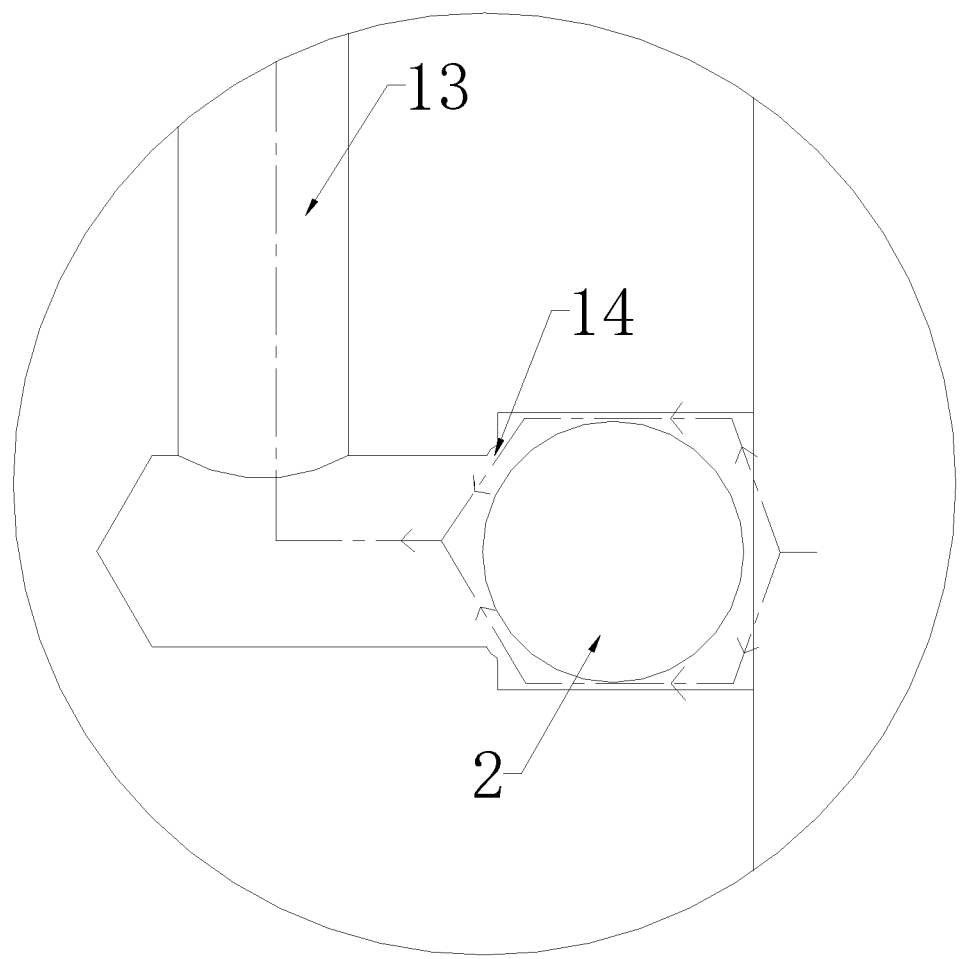
FIG. 2 shows a first blocking ball positioned in an open position.
Figure 3:
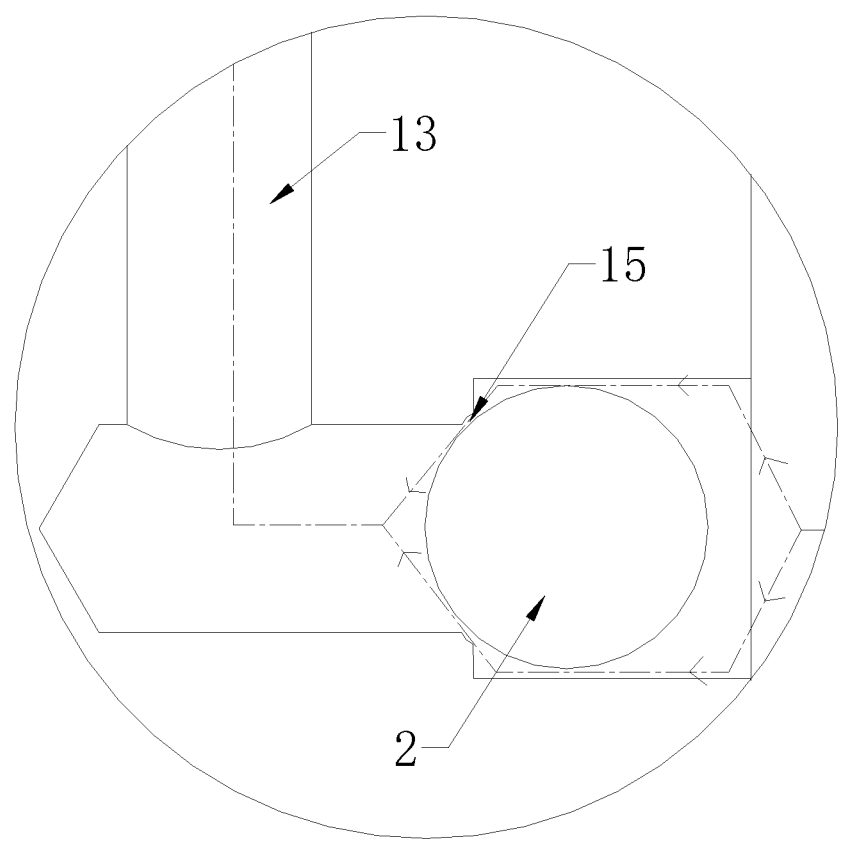
FIG. 3 shows the second blocking ball positioned in a blocking position.

Referring to the FIG. 1 to FIG. 3, an oil return mechanism includes a base 1, a control switch 101; a first blocking ball 2 mounted in the base 1, an elastic member 3 mounted between the first blocking ball 2 and the base 1. The base 1 has a liquid storing cavity 11, a liquid returning cavity 12, a communicating cavity 13, a first communicating opening 14 communicating between the liquid returning cavity 12 and the communicating cavity 13, and a second communicating opening 102 communicating between the communicating cavity 13 and the liquid storing cavity 11. The control switch 101 is adapted for controlling the second communicating opening 102 open or closed so that the communicating cavity 13 and the liquid storing cavity 11 are connected or separated. The first blocking ball 2 moves between a blocking position and an open position with an external force. When the first blocking ball 2 is in the open position, the whole first communicating opening 14 is open, and thus a fluid flows from the liquid returning cavity 12 to the communicating cavity 13. The first communicating opening 14 is positioned in a communicating portion of the base 1. When the first blocking ball 2 is in the blocking position, one or more liquid guiding gaps 15 are formed between the first blocking ball 2 and the communicating portion of the base 1. The liquid guiding gap 15 communicates between the liquid returning cavity 12 and the communicating cavity 13.

In use, When the first blocking ball 2 is in an open position, a fluid flows from the liquid returning cavity 12 to the communicating cavity 13 through the first communicating opening 14. When the first blocking ball 2 is in the blocking position, the fluid flows from the liquid returning cavity 12 to the communicating cavity 13 through the liquid guiding gap 15, which can reduce the amount of the flowing liquid.

Therefore, the speed of the fluid flowing from the liquid returning cavity 12 to the communicating cavity 13 can be regulated by the movement of the first blocking ball 2.

When the jack is in operation and no-load, the first blocking ball 2 is in the open position, and the liquid flows from the liquid returning cavity 12 to the communicating cavity 13 through the first communicating opening 14, so that the jack slows down rapidly. When the jack is on load, the first blocking ball 2 is in the blocking position; the fluid can only flows to the communicating cavity 13 through the liquid guiding gap 15. The liquid guiding gap 15 can reduce the amount of the flowing liquid, thus the fluid slows down, and the jack descends slowly. The present invention has the advantages of simple structure, convenient manufacture and great reduction of cost. The liquid guiding gap 15 has an advantage of avoiding clogging.

The liquid guiding gap 15 can be manufactured as follows. A sealing surface in the communicating portion is made firstly, and the sealing surface matches the first blocking ball 2. Secondly, a recess in the sealing surface is made so that the first communicating opening 14 is not completely sealed when the first blocking ball is in the blocking position. In other embodiments, the first blocking ball 2 may be irregular shape so that the first communicating opening 14 is not completely sealed. The size of the liquid guiding gap 15 has a direct impact on the speed of the returning fluid in the blocking position, and can be set as requirements. The amount of the liquid guiding gap 15 can be set as requirements, such as one or more.

Specifically, an end of the elastic member 3 is mounted in the communicating cavity 3, and the other end of the elastic member 3 is positioned against the first blocking ball 2, which is convenient for assembling.

The first blocking ball 2 moves between the blocking position and the open position with the external force, such as hydraulic pressure. Preferably, the first blocking ball 2 moves between the blocking position and the open position under the cooperative control of an elastic force of the elastic member 3 and the hydraulic pressure of the liquid in the liquid returning cavity 12. Specifically, the open position is positioned in an end of the liquid returning cavity 12 adjacent to the first communicating opening 14, and a diameter of the end of the liquid returning cavity 12 is larger than the one of the first blocking ball 2.

The elastic force generated by the elastic member acts on the first blocking ball 2 from the blocking position to the open position. That is to say, the elastic member 3 is in a compressed state when the first blocking ball 2 is in the blocking position. The elastic member 3 generates a force on the first blocking ball 2 towards the open position when the elastic member 3 is released. The liquid in the liquid returning cavity 12 generates a force on the first blocking ball 2 from the open position to the blocking position.

Preferably, the elastic member 3 may be a spring or an elastic ring.

The control switch 101 includes a second blocking ball 4 mounted in the base 1 and a valve rod 5. The valve rod 5 is adapted for pushing the second blocking ball 4 in a sealing position for sealing the second communicating opening 102. The valve rod 5 is threadly coupled to the base 1. The simplification of the control switch 101 can reduce costs. In use, the valve rod 5 pushes the second blocking ball 4 in the sealing position so that the second communicating opening 102 is sealed. The valve rod 5 is screwed to release the second blocking ball 4, and the fluid pushes the second blocking ball 4 upwards so that the second communicating opening 102 is open.

In actual design, the liquid returning cavity 12 is generally configured with a piston. The moving speed of the piston is controlled by the fluid flowing from the liquid returning cavity 12, and thus the descending speed of the jack is controlled by the piston.

In actual use, when the jack is no load, the valve rod 5 is screwed to release the second blocking ball 4. The first blocking ball 2 moves to the open position when the elastic force of the spring is larger than the hydraulic pressure of the hydraulic oil in the liquid returning cavity 12. The hydraulic oil flows from the liquid returning cavity 12 to the communicating cavity 13 through the first communicating opening 14 (referred to the arrow direction in FIG. 2), and further goes through the communicating cavity 13 to push the second blocking ball 4 upwards, and then flows into the liquid storing cavity 11. When the jack is on load, the valve rod 5 is screwed to release the blocking ball 4. The first blocking ball 2 is in blocking position when the elastic force of the spring is smaller than the hydraulic pressure of the hydraulic oil in the liquid returning cavity 12. The hydraulic oil flows into the communicating cavity 13 through the liquid guiding gap 15 (referred to the arrow direction in FIG. 3), and pushes the second blocking ball 4 upwards, and then flows into the liquid returning cavity 11. Therefore, the jack slows down.

Figure 4:
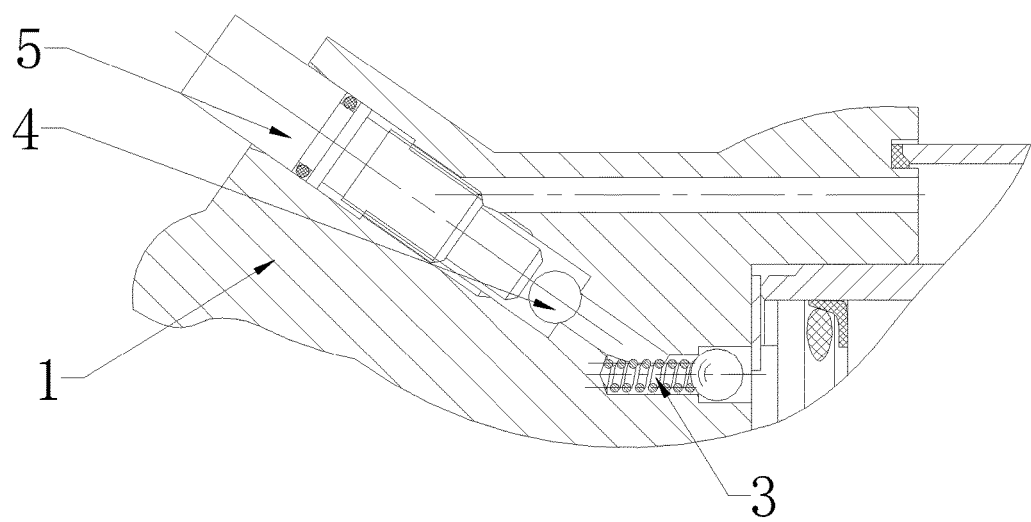
FIG. 4 is a construction schematic diagram of another embodiment of the present invention.

FIG. 4 shows a construction schematic diagram of a second embodiment of the present invention. The difference between the FIG. 4 and the FIG. 1 is the installation how the valve rod 5 coupled to the base 1. In FIG. 1, the valve rod 5 is vertically and threadly coupled to the base 1. In FIG. 4, the valve rod 5 is obliquely and threadly coupled to the base 1. The installation how the valve rod 5 coupled to the base us not limited only if the valve 5 can push the second blocking ball 4.

Various modifications could be made to the embodiments by those of ordinary skill in the art without departing from the true spirit and scope of the disclosure. And those modified embodiments are covered by the claims of the disclosure.

What is claimed is:

1. An oil return mechanism, comprising:
a base, a control switch, a first blocking ball mounted in the base, an elastic member mounted between the first blocking ball and the base; wherein the base has a liquid storing cavity, a liquid returning cavity, a communicating cavity, a first communicating opening communicating between the liquid returning cavity and the communicating cavity, and a second communicating opening communicating between the communicating cavity and the liquid storing cavity;

wherein the control switch is adapted for placing the second communicating opening into open or closed position so that the communicating cavity and the liquid storing cavity are connected or separated; wherein the first blocking ball moves between a blocking position and an open position with an external force;

wherein when the first blocking ball is in the open position, the whole first communicating opening opens, and thus a fluid flows from the liquid returning cavity to the communicating cavity;

wherein the first communicating opening is positioned in a communicating portion of the base;

wherein when the first blocking ball is in the blocking position, at least one liquid guiding gaps are formed between the first blocking ball and the communicating portion of the base; and wherein the liquid guiding gap communicates between the liquid returning cavity and the communicating cavity;

wherein the control switch includes a second blocking ball mounted in the base and a valve rod;

wherein the valve rod is adapted for pushing the second blocking ball in a sealing position for sealing the second communicating opening; and wherein the valve rod is threadly coupled to the base.

2. The oil return mechanism of claim 1, wherein an end of the elastic member is mounted in the communicating cavity, and the other end of the elastic member is positioned against the first blocking ball.

3. The oil return mechanism of claim 1, wherein the elastic member is a spring.

4. The oil return mechanism of claim 1, wherein a plurality of liquid guiding gaps is formed between the first blocking ball and the communicating portion of the base.

5. The oil return mechanism of claim 1, wherein the first blocking ball moves between the blocking position and the open position under a cooperative control of an elastic force of the elastic member and a hydraulic pressure of the liquid in the liquid returning cavity.

6. The oil return mechanism of claim 5, wherein the elastic force generated by the elastic member is applied on the first blocking ball and the elastic force places the first blocking ball from the blocking position to the open position.

7. The oil return mechanism of claim 5, wherein the first blocking ball is in an end of the liquid returning cavity adjacent to the first communicating opening when the first blocking ball is in the open position, and a diameter of the end of the liquid returning cavity is larger than the first blocking ball.

8. The oil return mechanism of claim 7, wherein the elastic force generated by the elastic member is applied on the first blocking ball and the elastic force places the first blocking ball from the blocking position to the open position.

* * * * *